US008472399B2

(12) United States Patent  (10) Patent No.: US 8,472,399 B2
Novak et al.  (45) Date of Patent:  Jun. 25, 2013

(54) RANGING CHANNEL STRUCTURES AND METHODS

(75) Inventors: Robert Novak, Ottawa (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 12/830,981

(22) Filed: Jul. 6, 2010

(65) Prior Publication Data
US 2012/0008590 A1  Jan. 12, 2012

(51) Int. Cl.
*H04W 4/00*  (2009.01)
(52) U.S. Cl.
USPC ............................ 370/330; 370/329; 370/331
(58) Field of Classification Search
None
See application file for complete search history.

(56) References Cited

U.S. PATENT DOCUMENTS

| | | | | |
|---|---|---|---|---|
| 2007/0060180 | A1* | 3/2007 | Muharemovic et al. | 455/509 |
| 2009/0147872 | A1 | 6/2009 | Chong et al. | |
| 2009/0247171 | A1 | 10/2009 | Suga | |
| 2009/0252028 | A1* | 10/2009 | Hwang et al. | 370/210 |
| 2010/0150099 | A1 | 6/2010 | Chen et al. | |
| 2010/0157933 | A1 | 6/2010 | Park et al. | |
| 2011/0069862 | A1* | 3/2011 | Krizek et al. | 382/100 |

FOREIGN PATENT DOCUMENTS

| | | | |
|---|---|---|---|
| EP | 1571770 | A2 | 7/2005 |
| EP | 2219398 | A1 | 4/2007 |
| WO | 2009008633 | A2 | 1/2009 |
| WO | 2009084922 | A2 | 7/2009 |
| WO | 2009072184 | A1 | 11/2009 |

OTHER PUBLICATIONS

International Searching Authority, PCT International Search Report mailed Nov. 24, 2010, in relation to International Application No. PCT/CA2010/001034 filed Jul. 6, 2010.
Robert Novak et al., IEEE C802.16-m-08/1076rI, Proposal for IEEE 802.16m SDD Text on Bandwidth Request/Renewal Channel, URL: http://www.iee802.org/16/tgm/index_older.html, available at least as early as Jun. 28, 2010.

(Continued)

*Primary Examiner* — David Oveissi
(74) *Attorney, Agent, or Firm* — Meyertons, Hood, Kivlin & Goetzel, P.C.

(57) ABSTRACT

To facilitate ranging between mobile terminals and a base station in a wireless communication network employing orthogonal frequency division multiplexing (OFDM) for uplink data communications, a periodic ranging channel for use by a mobile terminal is defined. The channel specifies a plurality N of blocks of sub-carrier frequencies of an OFDM frequency band which are non-contiguous within the OFDM frequency band. The channel also specifies a time slot within an OFDM subframe which spans one or more OFDM symbol periods. A ranging transmission is periodically sent as a spread signal across the specified N blocks of sub-carrier frequencies within the specified time slot. The duration of the ranging transmission may be less than a duration of the OFDM subframe. A notional grid of tiles representing time and frequency resources associated with the subframe may facilitate channel definition. A similar approach may be used to define an initial access channel for initial access transmissions.

20 Claims, 8 Drawing Sheets

OTHER PUBLICATIONS

Robert Novak et al., IEEE C802.16m-09/0248, Proposed Text on BW Request for the IEEE 802.16m Amendment, URL: http://www.ieee802.org/16/tgm/index_older.html, available at least as early as Jun. 28, 2010.

Robert Novak et al., Proposal for IEEE 802.16m UL Access and Resource Request Channels.

Sophie Vzric et al., Proposal for IEEE 802.16m UL Resource Blocks and Channelization, URL: http://wirelessman.org/tgm/contrib/C80216m-08_350.pdf, available at least as early as Feb. 9, 2011.

Dongshen Yu et al., Proposal for IEEE 802.16m Uplink Pilot Structures, URL: http://wirelessman.org/tgm/contrib/C80216m-08_348.pdf, at least as early as Feb. 9, 2011.

Robert Novak et al., Proposal for IEEE 802.16m UL Access and Resource Request Channels, URL: http://wirelessman.org/tgm/contrib/C80216m-08_352r1.pdf, available as early as Feb. 24, 2011.

Office Action in related U.S. Appl. No. 12/806,182, issued Apr. 9, 2012, pp. 1-11.

* cited by examiner

RANGING CHANNEL STRUCTURES AND METHODS

CROSS-REFERENCE TO RELATED APPLICATIONS

This application is a continuation-in-part of the non-provisional application no. 12/806,182, resulting from conversion under 37 C.F.R. §1.53(c)(3) of U.S. provisional patent application no. 61/223,108 filed on Jul. 6, 2009, which claims the benefit of U.S. provisional patent application No. 61/078,574 filed on Jul. 7, 2008, the contents of each of which are hereby incorporated by reference, as if fully and completely set forth herein.

TECHNICAL FIELD

The present disclosure relates to wireless communication techniques in general, and to techniques relating to orthogonal frequency division multiplexing (OFDM) in particular.

BACKGROUND

In a wireless communication network, such as a cellular network, a plurality of mobile stations or mobile terminals (e.g. cellular telephones, smartphones, or other forms of wireless communication devices) may communicate with a base station by way orthogonal frequency division multiplexing for uplink and/or downlink data communications. Orthogonal frequency division multiplexed networks may facilitate cell-based high speed services such as those provided under the IEEE 802.16 standards, which may be referred to as WiMAX or less commonly as WirelessMAN or the Air Interface Standard.

In a cellular network using OFDM, a base station of a cell may be responsible for allocating OFDM frequency band sub-carrier frequencies to mobile terminals within the cell for use in particular time slots. If the distance between the mobile terminals and the base station varies over time, the transmission delay of wireless data communications between the mobile terminals and the base station may also vary. This may disadvantageously result in misalignment of data communications received at the base station with respect to the particular time slots. Similar problems may arise when a mobile terminal communicates with a base station for the first time, e.g. upon entry of a mobile terminal into cell or upon awakening of the mobile terminal from a period of idleness, because the distance to the base station may not yet have been established.

ART RELATED TO THE APPLICATION

In draft IEEE 802.16m System Description Document, IEEE 802.16m-08/003r1, dated Apr. 15, 2008, it is stated that:

This [802.16m] standard amends the IEEE 802.16 WirelessMAN-OFDMA specification to provide an advanced air interface for operation in licensed bands. It meets the cellular layer requirements of IMT-Advanced next generation mobile networks. This amendment provides continuing support for legacy WirelessMAN-OFDMA equipment.

And the standard will address the following purpose:

i. The purpose of this standard is to provide performance improvements necessary to support future advanced services and applications, such as those described by the ITU in Report ITU-R M.2072.

More generally, the below embodiments could be applied in any communication system which employs multi-carrier or OFDM-type technology on the uplink.

SUMMARY

In one aspect, there is provided in a wireless communication network employing orthogonal frequency division multiplexing (OFDM) for uplink data communications between mobile terminals and a base station, a method of performing periodic ranging between a mobile terminal and the base station, the method comprising: defining a periodic ranging channel for use by the mobile terminal, the periodic ranging channel comprising a plurality N of blocks of sub-carrier frequencies of an OFDM frequency band, the N blocks of sub-carrier frequencies being non-contiguous within the OFDM frequency band, the channel further comprising a time slot, within a particular OFDM subframe, within which ranging transmissions shall be sent from the mobile terminal to the base station using the N blocks of sub-carrier frequencies, the time slot spanning one or more OFDM symbol periods but being less that a duration of the OFDM subframe; and periodically sending a ranging transmission over the periodic ranging channel from the mobile terminal to the base station, the sending comprising transmitting the ranging transmission within the time slot as a spread signal, the spread signal being spread across the sub-carrier frequencies of the N blocks, wherein a duration of the ranging transmission is less than the duration of the OFDM subframe.

In another aspect, there is provided in a wireless communication network employing orthogonal frequency division multiplexing (OFDM) for uplink data communications between mobile terminals and a base station, a method of performing periodic ranging between a mobile terminal and the base station, the method comprising: defining a periodic ranging channel for the mobile terminal, the periodic ranging channel being represented as a plurality N of tiles in a notional grid of tiles representing OFDM time and frequency resources, the notional grid having a time dimension comprising a plurality of OFDM symbol periods of an OFDM subframe and a frequency dimension comprising a plurality of blocks of sub-carriers of an OFDM frequency band, each of the N tiles representing an allocation of one of the blocks of sub-carriers for use by at least the mobile terminal during one or more of the OFDM symbol periods, the N tiles being non-contiguous in the frequency dimension of the notional grid, the N tiles each spanning the same time slot in the time dimension of the notional grid, the time slot having a duration that is one or more OFDM symbol periods but is less than a duration of the OFDM subframe; periodically sending a ranging transmission from the mobile terminal to the base station over the periodic ranging channel, the sending comprising transmitting the ranging transmission within the time slot as a spread signal, the spread signal being spread across the sub-carrier frequencies of the N tiles, with a duration of the ranging transmission being less than the duration of the OFDM subframe.

In a further aspect, there is provided in a wireless communication network employing orthogonal frequency division multiplexing (OFDM) for uplink data communications between mobile terminals and a base station, a method of performing initial access from a mobile terminal to the base station, the method comprising: defining an initial access channel for use by the mobile terminal, the initial access channel comprising a plurality N of blocks of sub-carrier frequencies of an OFDM frequency band, the N blocks of sub-carrier frequencies being non-contiguous within the OFDM frequency band, the initial access channel further comprising a time slot, within a particular OFDM subframe, within which initial access transmissions shall be sent from the mobile terminal to the base station using the N blocks of sub-carrier frequencies, the time slot spanning one or more OFDM symbol periods but being less that a duration of the OFDM subframe; and sending an initial access transmission over the periodic ranging channel from the mobile terminal to the base station, the sending comprising transmitting the initial access transmission within the time slot as a spread signal, the spread signal being spread across the sub-carrier frequencies of the N blocks, wherein a duration of the initial access transmission is less than the duration of the OFDM subframe, wherein the number of OFDM symbol periods comprising the time slot is configurable based on an estimated or determined maximum ranging delay between the mobile terminal and the base station.

Aspects and features of the present disclosure will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present disclosure will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
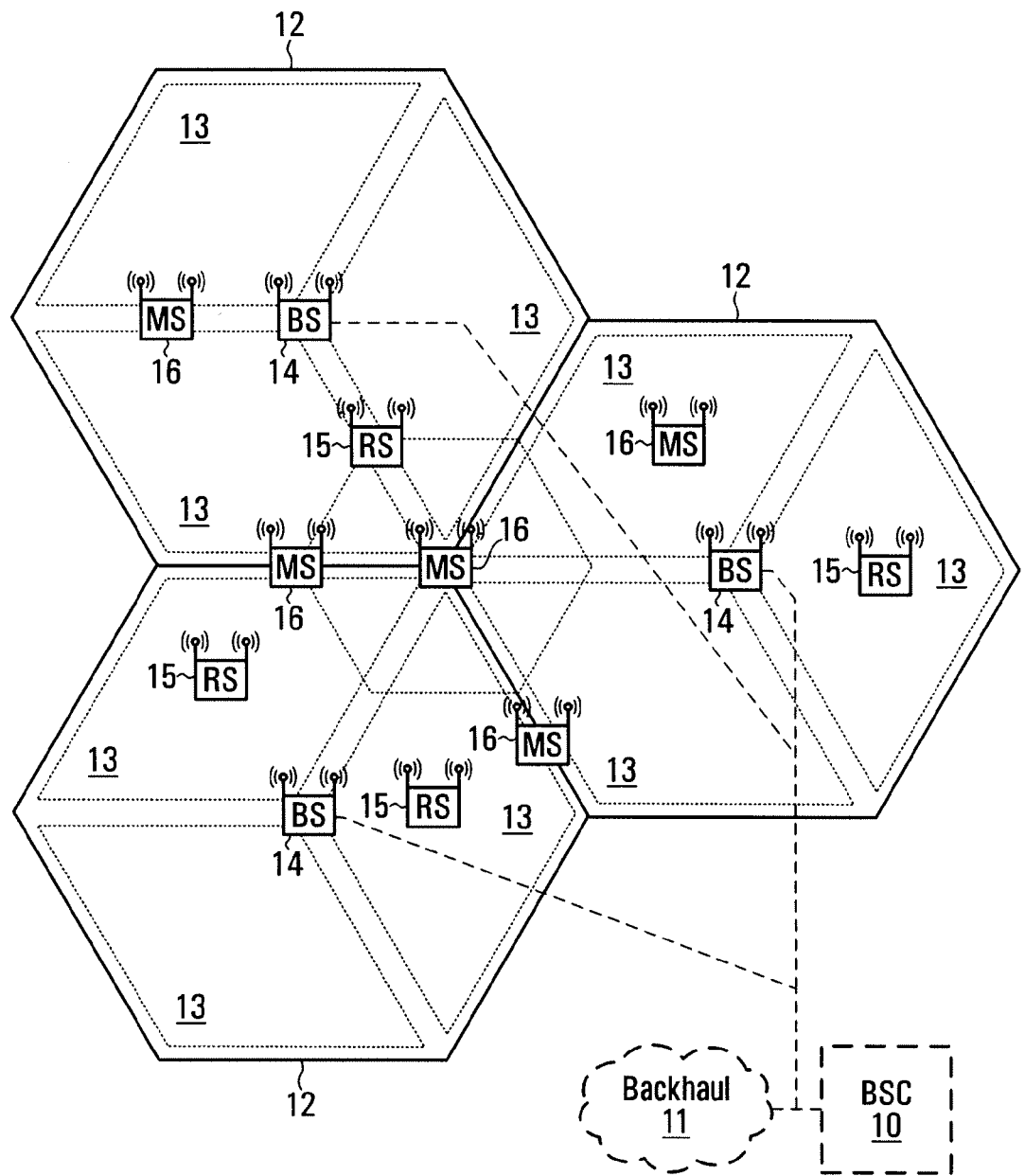
FIG. 1 is a block diagram of a cellular communication system.

Referring to the drawings, FIG. 1 shows a base station controller (BSC) 10 which controls wireless communications within multiple cells 12, which cells are served by corresponding base stations (BSs) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
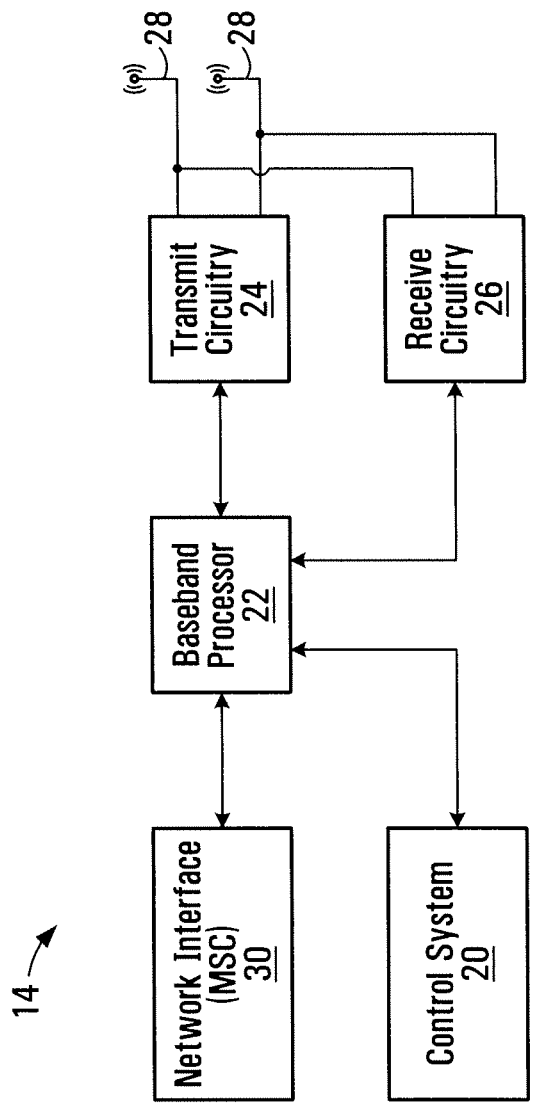
FIG. 2 is a block diagram of an example base station that might be used to implement some embodiments of the present disclosure.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
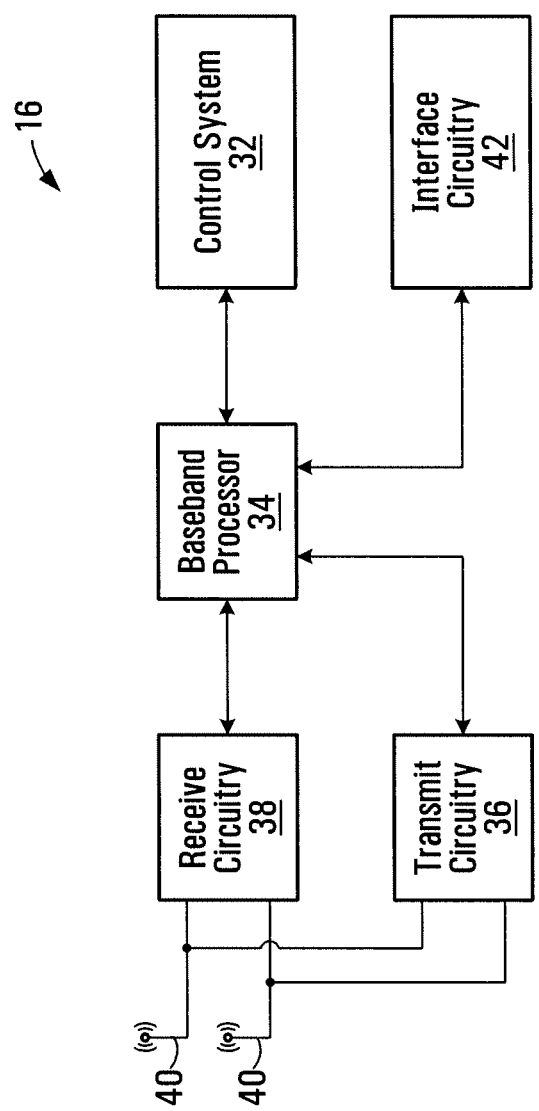
FIG. 3 is a block diagram of an example wireless terminal that might be used to implement some embodiments of the present disclosure.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM may be used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM may be used for downlink transmission from the base stations 14 to the relays 15 and from relay stations 15 to the mobile terminals 16.

Figure 4:
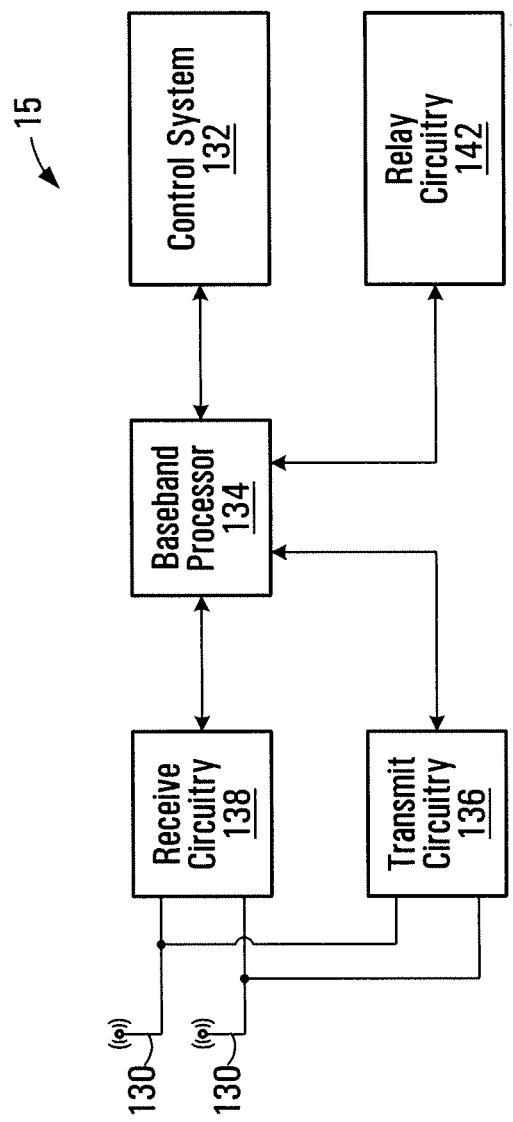
FIG. 4 is a block diagram of an example relay station that might be used to implement some embodiments of the present disclosure.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
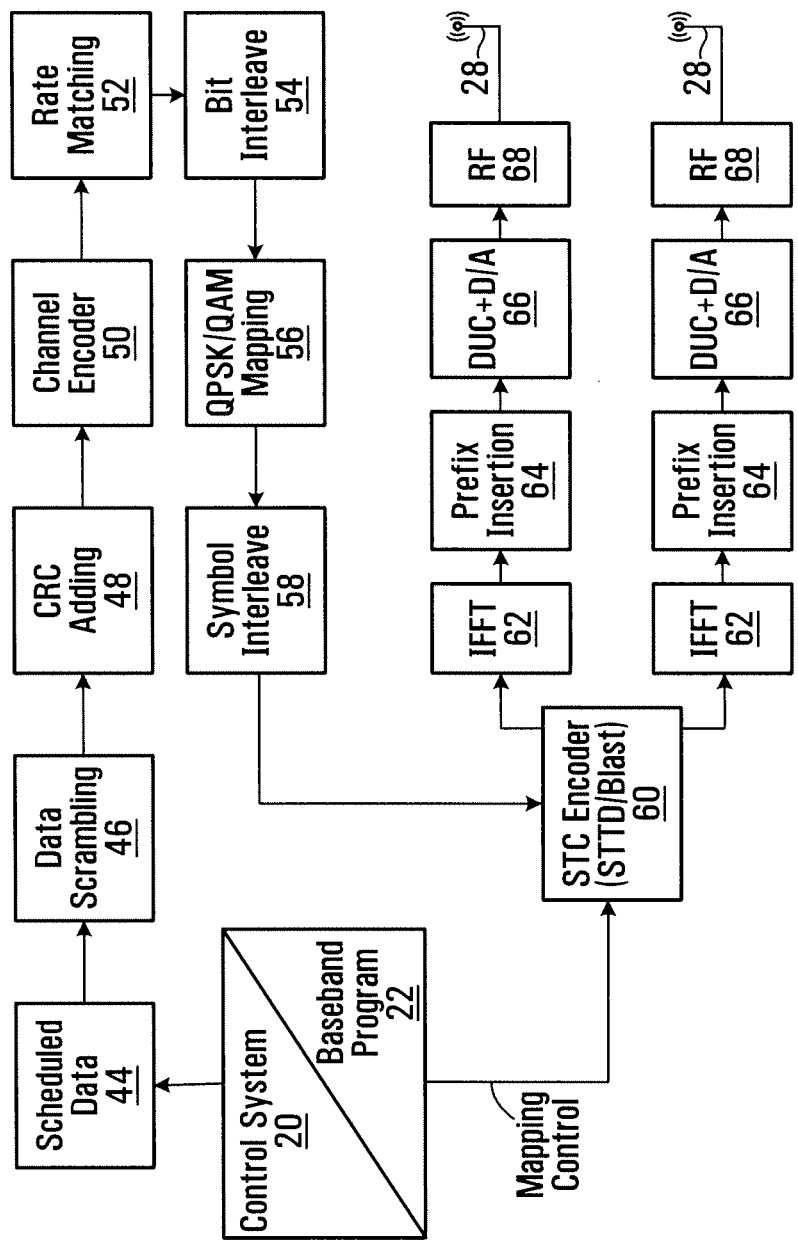
FIG. 5 is a block diagram of a logical breakdown of an example OFDM transmitter architecture that might be used to implement some embodiments of the present disclosure.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation may be chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
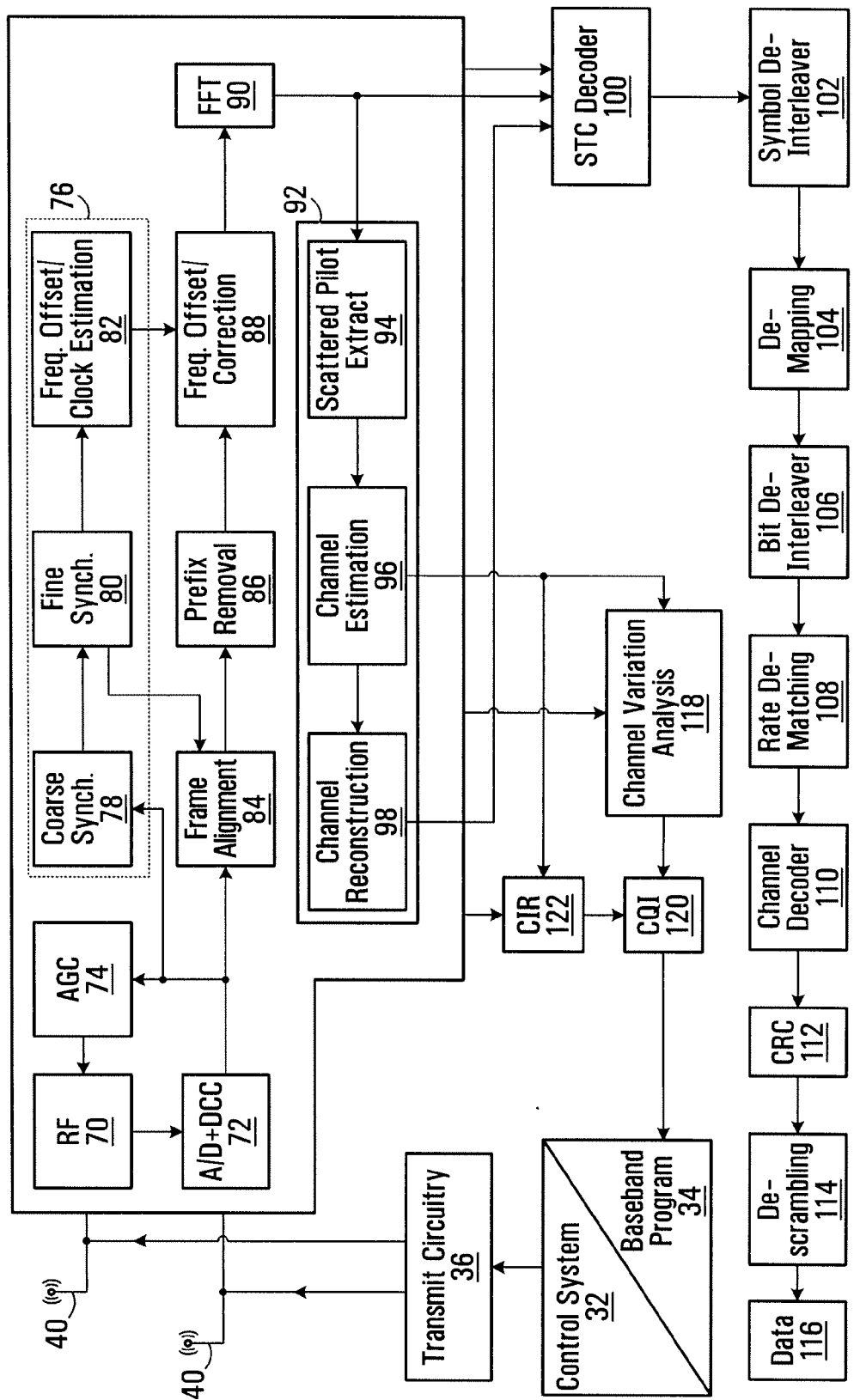
FIG. 6 is a block diagram of a logical breakdown of an example OFDM receiver architecture that might be used to implement some embodiments of the present disclosure.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 7:
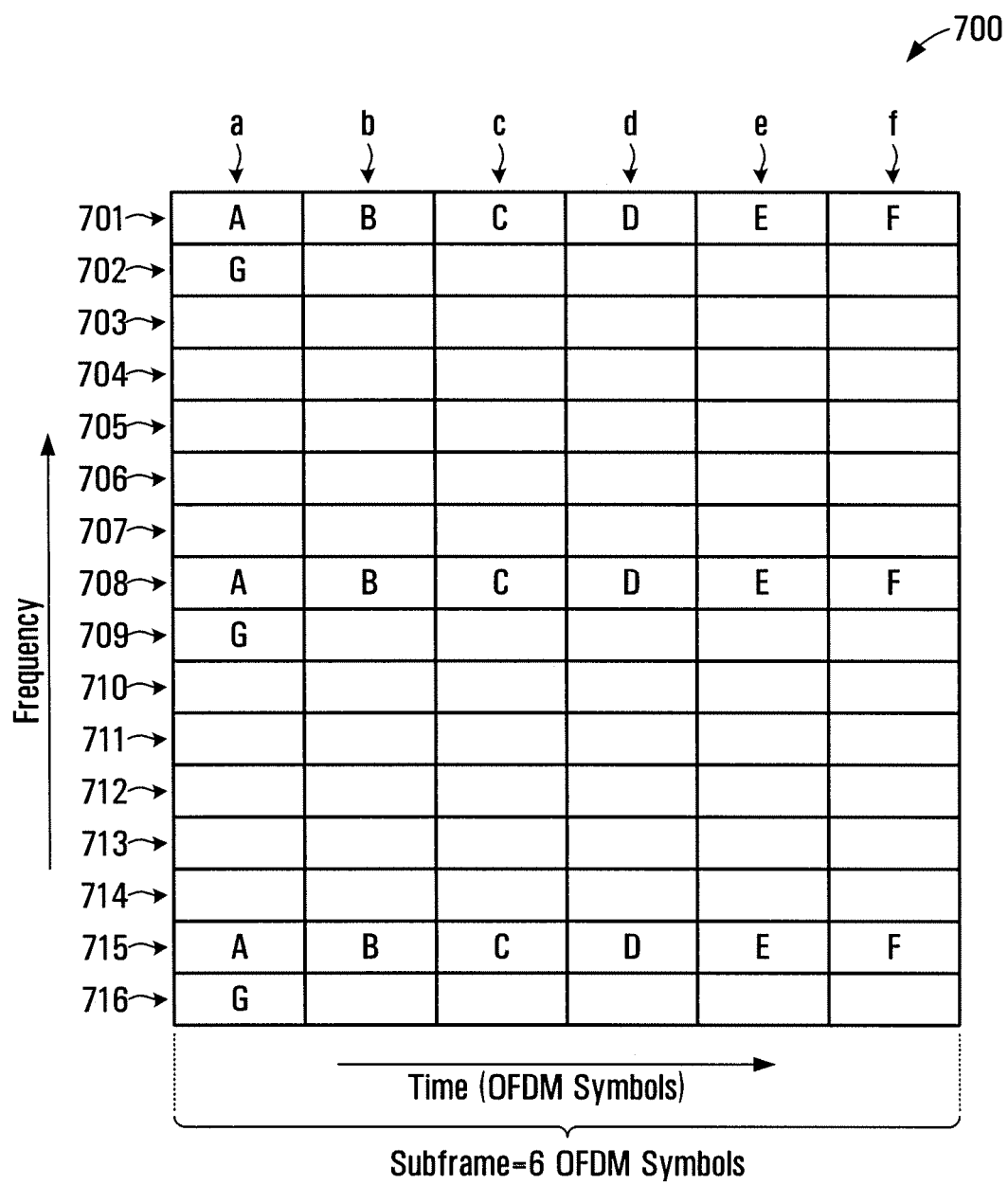
FIGS. 7 and 8 illustrate notional grids representing time and frequency resources associated with an OFDM subframe, which may facilitate the definition of ranging channels.

FIG. 7 illustrates a notional grid 700 representing allocatable time and frequency resources for a single OFDM subframe for an exemplary sector 18 of FIG. 1. The grid 700 may alternatively be referred to as a "resource block." In some embodiments, the notional grid 700 may be represented as a corresponding data structure, such as a table or two-dimensional array, in memory (not expressly shown) of a base station 16 of the relevant exemplary sector 18 or cell 14 (FIG. 1). The base station may be responsible for allocating the represented time and frequency resources among any mobile terminals operating within the sector. The OFDM subframe whose time and frequency resource allocation is represented by notional grid 700 may be one of F subframes comprising an OFDM frame in uplink data communications with the base station 16 originating from various mobile terminals within the cell or sector, where F is an integer greater than one.

As illustrated, notional grid 700 has a time dimension and a frequency dimension, which are shown on the horizontal axis and the vertical axis respectively. Other representations of grid 700 are possible. It will be appreciated that the grid 700 is notional and may not actually be logically or physically represented (whether as a grid per se or otherwise) in some embodiments.

Each column in the time dimension of grid 700 represents a single OFDM symbol period. The OFDM symbol period may be a predetermined duration, dictated by operative standards (e.g. IEEE 802.16m), for transmitting an OFDM symbol. In the illustrated example, the time dimension of grid 700 comprises six columns labelled a-f. The number of columns (six) reflects the fact that the represented OFDM subframe has a duration of six OFDM symbol periods. In alternative embodiments, the number of OFDM symbols periods in the time dimension may be less than or greater than six.

The frequency dimension of exemplary notional grid 700 comprises sixteen rows labelled 701-716. The number of rows (sixteen) reflects the fact that the sub-carrier frequencies (or simply "sub-carriers") of the operative OFDM frequency band have been partitioned into sixteen blocks. Each of the sixteen blocks of sub-carriers is capable of being allocated to a different mobile terminal; moreover, more than one block of sub-carriers may be assigned to a single mobile terminal. In alternative embodiments, the number of blocks in the frequency dimension may be less than or greater than sixteen.

Each block in the frequency dimension contains (spans) a plurality of orthogonal sub-carrier frequencies, which may for example be 6, 9 or 18 in number. The range of sub-carrier frequencies in each block may be such that a variation in gain from the highest sub-carrier to the lowest sub-carrier frequency within the sub-range is minimal. In other words, the range of sub-carrier frequencies in each block may span a frequency that is less than the coherence bandwidth of the channel. Each sub-carrier frequency can be used to modulate one modulation symbol. Each sub-carrier can therefore represent one bit during a single OFDM time period, or more than one bit if modulated appropriately.

Each intersection between a row and column of grid 700 forms a tile. A tile represents an allocation of the block of sub-carriers represented by the row for use during the OFDM symbol period that is represented by the column. In FIG. 7, a tile containing an alphanumeric identifier signifies that the time and frequency resources have been allocated to a channel identified by that alphanumeric identifier. An empty tile may signify either that the time and frequency resources associated with that tile have not been allocated or that they have been allocated for use unrelated to the present disclosure (i.e. unrelated to periodic ranging).

Based on the above-described conventions, it can be seen that FIG. 7 shows twenty-one allocated tiles of grid 700. Specifically, tiles 701a, 708a and 715a have been collectively allocated as a first channel whose identifier is "A"; tiles 701b, 708b and 715b have been collectively allocated as a first channel whose identifier is "B"; tiles 701c, 708c and 715c have been collectively allocated as a first channel whose identifier is "C"; tiles 701d, 708d and 715d have been collectively allocated as a first channel whose identifier is "D"; tiles 701e, 708e and 715e have been collectively allocated as a first channel whose identifier is "E"; tiles 701f, 708f and 715f have been collectively allocated as a first channel whose identifier is "F"; and tiles 702a, 709a and 716 have been collectively allocated as a first channel whose identifier is "G." As will be described, the allocations may be centrally orchestrated by a base station 14 or base station controller 10. The number of possible distinct channels within a grid is referred to as M. For example, if the entire grid of 96 tiles of FIG. 7 were used for periodic ranging, and if it is assumed that N=3 (i.e. that there are three tiles per channel), then M would be 96/3 or 32. In general, M is configurable.

As noted above, the plurality of tiles that are allocated to a particular are collectively referred to as a "channel" (or, alternatively, as a "location" or "transmission opportunity") within the grid 700. In the illustrated embodiment, the number of tiles defining each channel is three. That is, each set of three tiles having a common channel identifier in FIG. 7 defines a single channel for use by a particular mobile terminal 16 to which the channel is allocated. As such, a total of seven periodic ranging channels are defined in FIG. 7, i.e. the number of channels shown in the subframe is seven (A-G). In general, the number of tiles allocated per channel is N, where N is an integer greater than one. The number of tiles per channel may differ as between different mobile terminals, even in the same cell 12 or sector 13 (FIG. 1), and may possibly be dynamically configurable, as will be described.

The relationship between channels and mobile terminals is either one-to-one or one-to-many. In the latter case, each mobile terminal using the same channel may employs a different one of a plurality of orthogonal or low correlation sequences, as described below, to allow its signal to be ascertained at the base station from among multiple signals transmitted simultaneously by multiple mobile terminals on that channel.

For clarity, it should be appreciated that the identifiers A-G used for identifying distinct mobile terminals in FIG. 7 bear no relationship in the identifiers a-f used to identify the columns of grid 700. It should also be appreciated that the mobile terminals identified using identifiers A-G are not necessarily expressly illustrated in FIG. 1. Further it should be appreciated that the allocations illustrated in FIG. 7 are as of a particular moment in time. As mobile terminals 16 are activated or deactivated or as they enter or exit a relevant sector 18, the allocated channels may change.

The channels defined in the grid of FIG. 7 are periodic ranging channels (or simply "ranging channels"). Such channels are intended for carrying transmissions specifically for use in ranging. Ranging refers to the estimating or determining of a degree of timing offset of wireless transmissions from a predetermined uplink subframe timing due to transmission delay between the mobile terminal and the base station. Periodic may for example allow data communications between the mobile terminal and the base station to be adjusted as necessary in order to account for movement of the mobile terminal within the relevant cell, sector or zone. For example, if it is determined that a mobile terminal 16 is currently far from the base station 14, the mobile terminal 16 may be configured to send its transmissions slightly earlier in time (forward time shift), in order to account for comparatively large MS-to-BS transmission delays. In contrast, if it is determined that a mobile terminal 16 is currently is proximate to the base station 14, the mobile terminal 16 may be configured to send its transmissions slightly later in time (backward time shift), in order to account for minimal MS-to-BS transmission delays in that case. This may permit transmissions originating from various mobile terminals within a cell, sector or zone to substantially coincide with one another upon arrival at the base station. Interference between transmissions originating from different mobile terminals in adjacent OFDM symbol periods of the subframe may thus be minimized.

In general, each ranging transmission that is periodically sent over a periodic ranging channel from the mobile terminal to the base station may comprise a known message or one a set of known signals. The message or signal is for the purpose of estimating or determining the timing of the arrival of a mobile transmission relative to a timing of the uplink subframes as defined at the base station. For example, the message or signal may allow a timing offset between a received wireless transmission originating from the mobile terminal and an OFDM subframe time slot (e.g. one or more OFDM symbol periods) to be estimated or determined. The message or signal may for example be an orthogonal or low correlation sequence, such as Walsh sequence, gold sequence, or Zadoff-chu sequences. In cases where the sequence is assigned by the base station, the base station may assign a unique sequence to each mobile terminal that uses the same channel (e.g. channel A of FIG. 7). For example, the sequence assigned to a first mobile terminal using channel A may be distinct from, and may be orthogonal or have a low correlation to, a sequence assigned to a second mobile terminal using channel A. The base station may re-use sequences between channels. The content of a ranging transmissions may be defined, e.g., in either or both of standards IEEE 802.16e and/or IEEE 802.16m, which are hereby incorporated by reference hereinto.

For clarity, a ranging transmission is distinct from a pilot symbol that may be used in OFDM data communications. A ranging transmission refers to a known message or signal, such as a sequence, that is sent over the plurality of sub-carriers that define a channel and is used for ranging purposes. A pilot symbol is a known symbol that is transmitted for channel estimation purposes.

A periodic ranging channel may be defined as follows. Firstly, one of the F subframes comprising an OFDM frame is initially selected for definition of a periodic ranging channel therewithin. The selection of a subframe is typically made by the mobile terminal 16, although this is not necessarily true in all embodiments (e.g. it may be made by the base station 14). In some embodiments, the selection of an OFDM subframe is unnecessary because the subframe to be used for periodic ranging is predetermined.

A notional grid representing the time and frequency resources of the selected or predetermined OFDM subframe may be used to facilitate channel definition. An exemplary grid 700 is shown in FIG. 7, as noted above.

Thereafter, time and frequency resources of the relevant subframe are chosen for the channel. This may be achieved through selection of a plurality N of tiles from the notional grid 700. The selection is typically made by the base station and then communicated to the mobile terminal 16, e.g. in accordance with mechanisms defined in IEEE standards 802.16e and/or 802.16m, although that is not necessarily true in all embodiments. The selection of the OFDM subframe and/or the N tiles may, optionally, be randomized in whole or in part, with a view to minimizing contention between the periodic ranging channels that are defined for different mobile terminals within the same cell, sector or zone. In some embodiments, the tiles from which the N tiles are be selected are limited a subset of the total number of tiles within the grid, e.g. if certain grid tiles are reserved or already used for other purposes.

In some embodiments, either one or both of the selected N blocks of frequency sub-carriers and the selected OFDM symbol periods may be dynamically selected by the mobile terminal 16 based on an average power estimate of a synchronization channel. For clarity, a synchronization channel is a channel that the mobile terminal uses for initial acquisition of a base station's signal and for initial downlink timing. The mobile station may estimate the received power of the synchronization channel from the base station. If the estimate suggests higher power, which may indicate the user is proximate to the base station, a ranging channel of short duration is used (for example, a duration of one OFDM symbol period as in FIG. 7). If the estimate is of lower power, which may suggests that the mobile is not proximate to the base station, a longer channel duration may be used (for example, a duration of two OFDM symbol periods as in FIG. 8). The estimate of the received power can come from numerous downlink message transmitted by the base station such as broadcast message, signalling channels, etc.

Each of the N tiles that is selected during definition of a single periodic ranging channel spans the same time period of the subframe, i.e. is situated within the same column, of the notional grid 700. This reflects the fact that the ranging transmission will be sent using the sub-carriers of each of the selected sub-carrier blocks simultaneously. The selected time period (i.e. the selected column(s) in the example) may be referred to herein as the "time slot" of the channel. For clarity, if it is assumed that each tile of grid 700 has a fixed width of one OFDM symbol period, then a channel spanning multiple OFDM symbol periods may be considered to have a number of tiles that is a multiple of N (e.g. if the number of spanned OFDM symbol periods is two, then the number of tiles may be considered to be 2N). Alternatively, if it is considered that a plurality of adjacent OFDM symbol periods of a single sub-carrier frequency block forms a single "wide" tile, the number of tiles comprising a multi-column-wide channel may be considered to be N. Regardless of these semantics, the selected tiles will be non-contiguous in the frequency dimension of notional grid 700. In other words, no two selected tiles will be adjacent to one another within the relevant column(s) of grid 700. This is with a view to introducing frequency diversity into each ranging transmission, to combat frequency-selective fading.

For example, the three tiles 701a, 708a and 715a of FIG. 7 that are selected for channel "A" are all within the same column (column a) of grid 700, indicating that they all occur within the same OFDM symbol period of the relevant OFDM subframe. As well, they are non-contiguous within column a.

As a further aspect of channel definition in at least some embodiments, a sequence for use as a ranging transmission over the channel is assigned (e.g. by the base station) or otherwise selected. As noted above, the sequence for a given channel will be mobile terminal specific. That is, to the extent that a particular channel (e.g. channel "A" of FIG. 7) is used for ranging transmissions by more than one mobile terminal, each mobile terminal using that channel will use a different sequence (e.g. one of a plurality of orthogonal or low correlation sequences). However, a sequence that is used for one channel may also be used for another channel comprising a distinct set of N tiles. In the present embodiment, the sequence has a length L which is greater than one. In some embodiments, the ranging transmission may be a predetermined message or signal that is not a sequence (e.g. if each channel will be used by only one mobile terminal).

In some embodiments, the base station may apprise the mobile terminal, via a communication over a downlink connection from the base station, of which N tiles shall define the channel and/or of the sequence to be used on that channel and/or of the sequence that the mobile terminal is to use over that channel. The mechanism for this communication may be defined in standards IEEE 802.16e and/or 802.16m.

Once the mobile terminal is aware of the tiles defining the channel and of the sequence to be used over that channel, the mobile terminal may thereafter periodically send a ranging transmission, e.g. as defined above, to the base station over the channel. In the present embodiment, sending of the ranging transmission comprises spreading the assigned or selected sequence of length L across the sub-carrier frequencies of the N blocks within the selected time slot of the OFDM subframe, wherein the spreading results in a spread signal. In general, the sending comprises transmitting constituent elements of the message or signal (e.g. portions or bits of the sequence) over respective sub-carrier frequencies of the N blocks within the selected time slot. If the channel duration spans more than one OFDM symbol period, the OFDM symbol may be transmitted for only a portion of the channel duration, with a view to reducing the likelihood of interference with data transmitted over the same sub-carrier frequencies in adjacent time slots. Each ranging transmission may then be used at the base station 14 for estimating or determining a current timing offset of transmissions originating at the mobile terminal relative to a timing of the OFDM subframe.

In some embodiments, the number of OFDM symbol periods used by each ranging transmission (e.g. the number of columns spanned by a channel) is configurable, e.g. by the base station or mobile terminal, based on an estimated or determined maximum ranging delay between the mobile terminal and the base station. For example, the number of OFDM symbol periods comprising a periodic ranging channel may be increased as the estimated or determined maximum ranging delay increases. The duration of the ranging transmission will generally be less than the duration of an OFDM subframe. However, it is possible that, in certain cases, the duration of the ranging transmission match the duration of the OFDM subframe, e.g. if the range between the mobile station and the base station is large.

In some embodiments, a subset of tiles in the notional grid for the subframe in which the periodic ranging channel is defined may be reserved for use in defining periodic ranging channels. The N tiles that are selected for the periodic ranging channel may be selected from only that subset of tiles. For example, in FIG. 7, the reserved subset of tiles may be all of the tiles in rows 701, 702, 708, 709, 715 and 716 of grid 700. This reserved subset of tiles is referred to as a "periodic ranging region." The base station may apprise each mobile terminal in the relevant sector or cell as to the bounds of the periodic ranging region by way of a downlink communication. The region may be indicated by way of identifiers of the encompassed tiles, or by way of identifiers of the encompassed sub-carrier frequency blocks and/or OFDM symbol periods.

In some embodiments, the periodic ranging region defined for a particular sector may be aligned with a periodic ranging region of a proximate sector, in both time and frequency. For example, if the notional grids for a particular OFDM subframe is the same for two sectors that are proximate to one another, then the subset of reserved tiles within those notional grids may be intentionally made the same. In other embodiments, the periodic ranging region defined for a particular sector may not be aligned with a periodic ranging region of other sectors in time or frequency.

If a periodic ranging region has been defined, then the size of the periodic ranging region, i.e. the extent of the subset of reserved tiles in the grid, may be sector-specific or cell-specific. If the sizes of the periodic ranging regions are different for different sectors, then at least a section of the region that is reserved for possible use by mobile terminals of cell edge users should be aligned in frequency and in time as between proximate sectors or cells. As is known in the art, cell edge users are users whose mobile terminals are far from their respective base stations and are approaching the boundary of another cell. A mobile terminal of a cell edge user generally transmits at a high power to in order to be received at the base station. This could interfere with the reception of desired signals at other base stations. Alignment of the periodic ranging regions, e.g. for cell edge users, allows for the transmission of these high power signals at the same time in different cells. This means that data or other sensitive signals, which may be utilizing time and frequency resources other than those used for ranging, may be protected against the high-power ranging transmissions of cell edge users.

Figure 8:
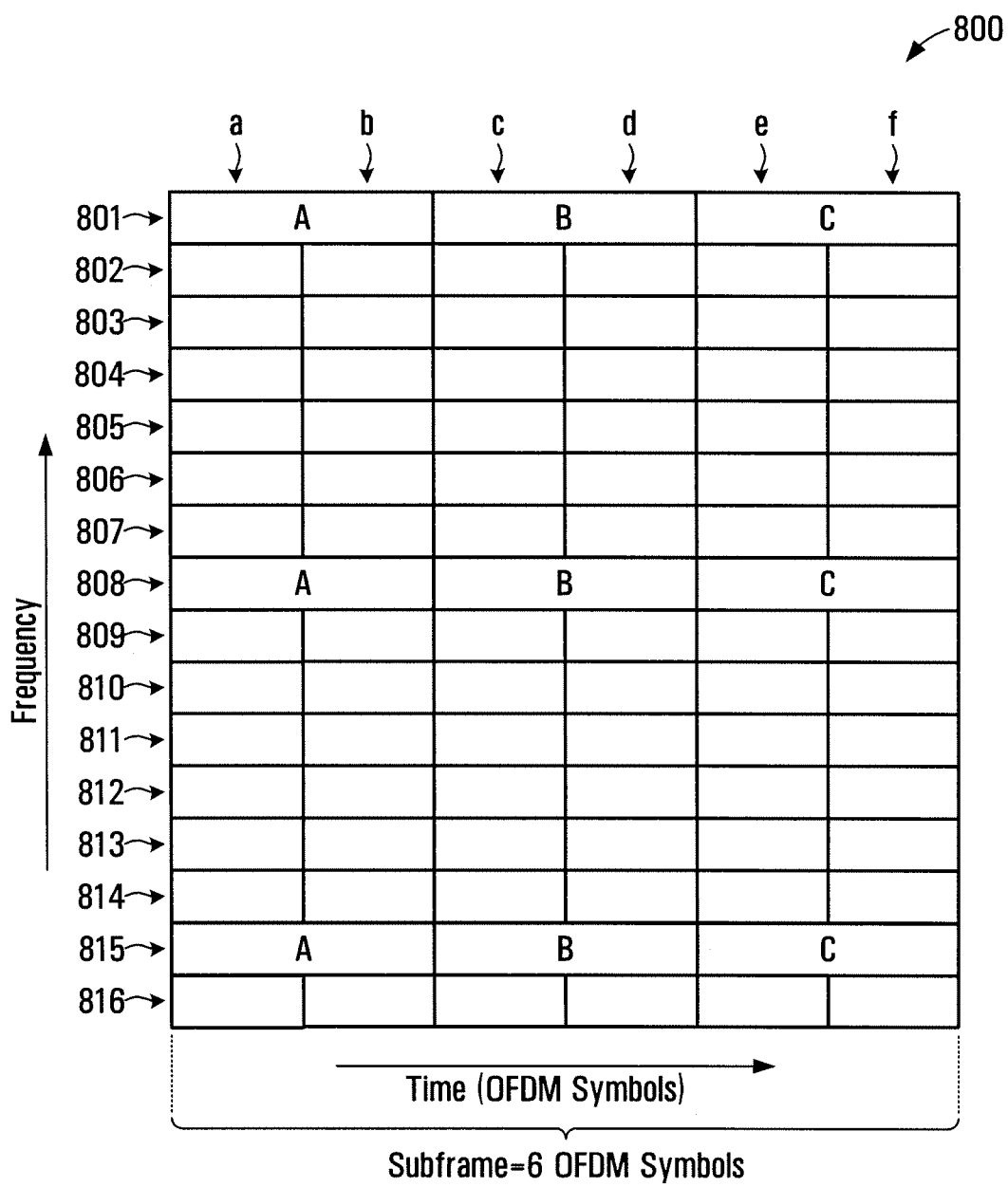

FIG. 8 illustrates the definition of three periodic ranging channels for an exemplary cell or sector of FIG. 1, which channels are different from any of the seven periodic ranging channels defined in FIG. 7. The conventions used in FIG. 8 are the same as those used in FIG. 7. Like notional grid 700, the notional grid 800 comprises sixteen rows 801-816 and six columns a-f. The sixteen rows reflect the same partitioning of the operative OFDM frequency band into sixteen blocks as in FIG. 7, and the six columns a-f reflect that the duration of the represented OFDM subframe is six OFDM symbol periods.

As shown in FIG. 8, three periodic ranging channels are defined. The first channel, denoted "A," is defined by tiles 801a-801b, 808a-808b, and 815a-815b. The second channel, denoted "B," is defined by tiles 801c-801d, 808c-808d, and 815c-815d. The third channel, denoted "C," is defined by tiles 801e-801f, 808e-808f, and 815e-815f. For clarity, the identifiers "A", "B" and "C" in the FIG. 8 do not refer to the same channels as are referred to by the identifiers "A", "B" and "C" in FIG. 7. The three periodic ranging channels defined in FIG. 8 differ from those of FIG. 7 primarily in that each channel spans two OFDM periods rather than one. The ranging transmissions (e.g. sequences) that are sent over these channels are not necessarily transmitted for the full duration of the ranging channel. For example, each may be transmitted for the duration of a single OFDM symbol period, timed so as to occupy the "middle" of the time slot defined by the two columns which define the channel (i.e. with a leading buffer interval preceding the substance of the ranging transmission within the time slot and a trailing buffer interval following the substance of the ranging transmission within the time slot, during which no data is sent by the mobile terminal over the relevant sub-carriers). The duration of the buffer intervals (i.e. the sum of their durations) may be substantially equal to a duration of the message, signal or sequence comprising the substance of the ranging transmission. By sending the sequence with a leading and trailing buffer, it may be possible to prevent or limit interference with any data that may be sent in the preceding or subsequent time slot of the subframe. Given that the time/frequency resources of the channels do not overlap, the same sequence may be used for the ranging transmission of each channel.

It is generally noted that the various methods and techniques relating to the definition and use of periodic ranging channels, as described above, may also be used for the definition and use of initial access channels. Initial access channels are used for sending initial access transmissions, which are initial communications from a mobile terminal to a base station upon entry of the mobile terminal into the relevant cell or sector or upon its awakening from a period of idleness. An initial access is generally comprised of a transmission of a known message, or one of a set of known signals, from a mobile station to a base station for the purpose of estimating the timing of the arrival of mobile transmission relative to the uplink subframe timing defined at the base station. As with ranging transmissions above, the message or signal may for example be a sequence, such as Walsh sequence, gold sequence, or Zadoff-chu sequences. The sequence assigned to a first mobile terminal using a particular channel may be distinct from, and may be orthogonal or have a low correlation to, a sequence assigned to a second mobile terminal using the same channel. In initial access, a timing offset of a mobile transmission relative to a subframe may be significantly larger than in the case of periodic ranging. For initial access, the channel to be used may be randomly selected from among a predetermined set of time/frequency resources available or reserved generally for this purpose.

Appendix A describes aspects of the embodiments described above.

The various methods and techniques described above may be effected in hardware, firmware, software, or combinations of these. In the case of firmware and/or software, processor-executable instructions may be loaded into the memory of a computing device, such as a mobile terminal, base station or a base station controller for example, from a computer-readable or machine-readable medium, such as a magnetic storage medium or optical disk, and may be executed by one or more processors at that device in order to effect the relevant method or technique.

The above-described embodiments of the present disclosure are intended to be examples only. Those of skill in the art may effect alterations, modifications and variations to the particular embodiments without departing from the scope of the disclosure.

APPENDIX A

Introduction

In 19442RO, details regarding time-frequency allocation of initial access channels is documented.

This document presents details, including on the symbol structure, of the initial access/ranging and periodic channel. In this document, we assume that the initial access region can be used for ranging, or/and ranging can also used for initial access. Initial access and ranging can also be preformed separately, but the design here applies to either.

UL Initial Access Channel

As in 1994RO, the initial access channel can occupy a set of distributed tile. The set maybe 1 or more tiles in size.

UL random access channel is a contention based channel for multiple MSs to request initial access. A designated resource is allocated for these initial access request.

The request is spread across the N resources tiles (e.g. N=3) used for Initial access. Spread in frequency domain over OFDM resources allows for frequency diversity. Spreading length over N resources is L.

Selection of access channel signaling ID: The MS randomly selects from one sequence L sequences. The MS randomly selects from M locations within the subframe, and F subframes (eg. A, B, C etc).

The number of distinct codes/resource/subframes per subframe is N=LMF. M and F are configurable by the base station.

In some embodiments, the region for periodic ranging also occupies a set of distributed tile. The set maybe 1 or more tiles in size.

Each user is assigned a sequence, and a set of tiles, to periodically transmit a ranging channel.

The signal is spread across the N resources tiles (e.g. N=3) used for periodic ranging. Spread in frequency domain over OFDM resources allows for frequency diversity. Spreading length over N resources is L.

Initial access regions

In some embodiments, the initial access region for different sectors should be aligned.

In some embodiments, there is a section of the region for initial access or region for cell edge users. This section for cell edge users should be aligned between adjacent sectors. In cases where the initial access/ranging regions are different size for different sectors, at least the section cell edge user should be aligned.

Periodic ranging regions

In some embodiments, the periodic ranging region for different sectors should be aligned.

In some embodiments, there is a section of the region for periodic ranging or region for cell edge users. This section for cell edge users should be aligned between adjacent sectors. In cases where the periodic ranging regions are different size for different sectors, at least the section cell edge user should be aligned.

In some embodiments, the base station can schedule periodic ranging from users in a manner that considers interference from other sector's raging channels. In some embodiments, this scheduling my be coordinated Symbol structure The initial access or ranging channel is sent over N tiles. Each tile occupies the time duration of subframe, as indicated in the figure, which in some embodiments is 6 OFDM symbols. The signal can be sent as one OFDM symbol that spans a duration less than 6 OFDM symbols, with an extended cyclic prefix.

In some embodiments, the number of OFDM symbols used by each ranging transmission is configurable. It is configured based of the size of the cell and estimated (or determined) maximum ranging delay.

In some embodiment the ranging channel can be configured to durations of one or more OFDM symbols; specifically including 2 and 3 symbols durations. In the case where the duration of a channel is less than a sub frame duration, multiple regions can be concatenated in time to span the sub frame duration.

In some embodiments, the initial access/ranging regions of different sizes and/or durations can co-exist in the same system, or possibly same frame or sub-frame. The users would select a region based an estimate, or inferred estimate from another parameter such as received power, etc., of their relative delay and therefore, the size of ranging channel that is appropriate. For example, based on an average power estimate of the synchronization channel, the mobile may determine whether its very close, or quite far from terminal Based on this determination, the mobile selects one of the ranging regions indicated in the broadcast information of the system. Additional formation to assist the mobile with this determination can be transmitted in the superframe header or other broadcast channel. The types and duration of ranging channels are indicated in the broadcast channel.

In some embodiments, the periodic ranging channel is sent over N tiles. Each tile occupies the time duration of subframe, as indicated in the figure, which in some embodiments is 6 OFDM symbols. The signal can be sent using the 6 OFDM symbols as used for other traffic and signaling.

Tile structure:

In some embodiments, for either periodic ranging or initial access/ranging regions: The each of the N tiles that make of the N channels span 6, 9 or 18 subcarriers. The total number of subcarriers used for a channel is a multiple (k) of 18 subcarriers (i.e. N x {6, 9, or 18}=18k).

What is claimed is:

1. In a wireless communication network employing orthogonal frequency division multiplexing (OFDM) for uplink data communications between mobile terminals and a base station, a method of performing periodic ranging between a mobile terminal and said base station, the method comprising:

defining a periodic ranging channel for use by said mobile terminal, said periodic ranging channel comprising a plurality N of blocks of sub-carrier frequencies of an OFDM frequency band, said N blocks of sub-carrier frequencies being non-contiguous within said OFDM frequency band, said channel further comprising a time slot, within a particular OFDM subframe, within which ranging transmissions shall be sent from said mobile terminal to said base station using said N blocks of sub-carrier frequencies, said time slot spanning one or more OFDM symbol periods but being less that a duration of said OFDM subframe; and periodically sending a ranging transmission over said periodic ranging channel from said mobile terminal to said base station, said sending comprising transmitting said ranging transmission within said time slot as a spread signal, said spread signal being spread across the sub-carrier frequencies of said N blocks, wherein a duration of said ranging transmission is less than the duration of said OFDM subframe, wherein the number of OFDM symbol periods comprising said time slot is configured based on an estimated or determined maximum ranging delay between said mobile terminal and said base station.

2. The method of claim 1 wherein the number of OFDM symbol periods comprising said time slot increases as said estimated or determined maximum ranging delay increases.

3. The method of claim 1 wherein said ranging transmission comprising a message or signal and wherein said transmitting comprises transmitting constituent elements of said message or signal over respective sub-carrier frequencies of said N blocks within said time slot of said OFDM subframe.

4. The method of claim 3 wherein said time slot spans multiple adjacent OFDM symbol periods of said subframe, wherein said ranging transmission comprises a leading buffer interval within said time slot and a trailing buffer interval within said time slot, and wherein the mobile terminal refrains from said transmitting of said constituent elements of said message or signal during said leading buffer interval and said trailing buffer interval.

5. The method of claim 1 wherein said mobile terminal is a first mobile terminal, said ranging transmission is a first ranging transmission, and wherein said periodic ranging channel is also for use by a second mobile terminal for sending a second ranging transmission, and wherein each of said first and second ranging transmissions comprise sequences that are orthogonal to one another.

6. The method of claim 1 wherein said periodic ranging channel is associated with a sector of a cell of said base station, wherein said N blocks of sub-carrier frequencies and said time slot are selected from a predetermined subset of sub-carrier frequency blocks of said OFDM frequency range and a predetermined subset of OFDM symbol periods of said subframe collectively referred to as a periodic ranging region for said sector, and wherein said periodic ranging region for said sector is aligned, in time and frequency, with a periodic ranging region of a proximate sector.

7. The method of claim 1 wherein said periodic ranging channel is associated with a sector of a cell of said base station, wherein said N blocks of sub-carrier frequencies and said time slot are selected from a predetermined subset of sub-carrier frequency blocks and a predetermined subset of OFDM symbol periods of said subframe collectively referred to as a periodic ranging region for said sector, and wherein either one or both of said predetermined subset of sub-carrier frequency blocks and said predetermined subset of OFDM symbol periods differs from the subset of sub-carrier frequency blocks and subset of OFDM symbol periods, respectively, of a periodic ranging region of a proximate sector.

8. The method of claim 7 wherein a section of said periodic ranging region for said sector is intended for defining periodic ranging channels for cell edge users and wherein said section is aligned, in time and frequency, with a section of the periodic ranging region of said proximate sector that is intended for defining periodic ranging channels for cell edge users.

9. The method of claim 1 wherein either one or both of said N blocks of sub-carrier frequencies and said time slot defining said periodic ranging channel are dynamically selected by the mobile terminal based on an average power estimate of a synchronization channel used for initial acquisition of a base station signal and for initial download timing.

10. The method of claim 1 wherein the number of OFDM symbol periods comprising said time slot is configured based on a size of a cell that is served by the base station.

11. In a wireless communication network employing orthogonal frequency division multiplexing (OFDM) for uplink data communications between mobile terminals and a base station, a method of performing periodic ranging between a mobile terminal and said base station, the method comprising:

defining a periodic ranging channel for said mobile terminal, said periodic ranging channel being represented as a plurality N of tiles in a notional grid of tiles representing OFDM time and frequency resources, said notional grid having a time dimension comprising a plurality of OFDM symbol periods of an OFDM subframe and a frequency dimension comprising a plurality of blocks of sub-carriers of an OFDM frequency band, each of said N tiles representing an allocation of one of the blocks of sub-carriers for use by at least said mobile terminal during one or more of said OFDM symbol periods, said N tiles being non-contiguous in the frequency dimension of said notional grid, said N tiles each spanning the same time slot in the time dimension of said notional grid, said time slot having a duration that is one or more OFDM symbol periods but is less than a duration of said OFDM subframe;

periodically sending a ranging transmission from said mobile terminal to said base station over said periodic ranging channel, said sending comprising transmitting said ranging transmission within said time slot as a spread signal, said spread signal being spread across the sub-carrier frequencies of said N tiles, with a duration of said ranging transmission being less than the duration of said OFDM subframe, wherein the number of OFDM symbol periods comprising said time slot is configured based on an estimated or determined maximum ranging delay between said mobile terminal and said base station.

12. The method of claim 11 wherein the number of OFDM symbols comprising said ranging transmission increases as said estimated or determined maximum ranging delay increases.

13. The method of claim 11 wherein said periodic ranging channel is associated with a sector of a cell of said base station, wherein said N tiles are selected from a predetermined subset of tiles of said grid referred to as periodic ranging region for said sector, and wherein said periodic ranging region for said sector is aligned, in the time dimension and the frequency dimension, with a periodic ranging region of a proximate sector.

14. The method of claim 11 wherein said periodic ranging channel is associated with a sector of a cell of said base station, wherein said N tiles are selected from a predetermined subset of tiles of said grid referred to as periodic ranging region for said sector, and wherein said periodic ranging region for said sector is different in size from a periodic ranging region for a proximate sector.

15. The method of claim 14 wherein a section of said periodic ranging region for said sector is for defining periodic ranging channels for cell edge users and wherein said section is aligned, in the time dimension and the frequency dimension, with a section of the periodic ranging region for said proximate sector.

16. The method of claim 11 wherein said N tiles defining said periodic ranging channel are dynamically selected by the mobile terminal based on an average power estimate of a synchronization channel used for initial acquisition of a base station signal and for initial download timing.

17. The method of claim 11 wherein said notional grid comprises six OFDM symbol periods in said time dimension, wherein said plurality N of tiles is three tiles, and wherein each of said three tiles spans two adjacent OFDM symbol periods.

18. The method of claim 17 wherein said periodic ranging channel is a first periodic ranging channel, said ranging transmission is a first ranging transmission and further comprising:

defining a second periodic ranging channel and a third periodic ranging channel, each of said second and third periodic ranging channels being represented as a distinct set of three tiles of said notional grid, each set of three tiles being non-contiguous in the frequency dimension of said grid and spanning two adjacent OFDM symbol periods in the time dimension of said grid, each said set of three tiles comprising the same sub-carriers in the frequency dimension of said grid as the corresponding three tiles of said first periodic ranging channel; and periodically sending second and third ranging transmissions from said mobile terminal to said base station over said second and third periodic ranging channels respectively, said sending comprising transmitting said ranging transmission as a spread signal, said spread signal being spread across the sub-carrier frequencies of said N tiles as two OFDM symbols during said two OFDM symbol periods, with a duration of said ranging transmission being less than the duration of said OFDM subframe.

19. The method of claim 11 wherein the number of OFDM symbol periods comprising said time slot is configured based on a size of a cell that is served by the base station.

20. In a wireless communication network employing orthogonal frequency division multiplexing (OFDM) for uplink data communications between mobile terminals and a base station, a method of performing initial access from a mobile terminal to said base station, the method comprising:

defining an initial access channel for use by said mobile terminal, said initial access channel comprising a plurality N of blocks of sub-carrier frequencies of an OFDM frequency band, said N blocks of sub-carrier frequencies being non-contiguous within said OFDM frequency band, said initial access channel further comprising a time slot, within a particular OFDM subframe, within which initial access transmissions shall be sent from said mobile terminal to said base station using said N blocks of sub-carrier frequencies, said time slot spanning one or more OFDM symbol periods but being less that a duration of said OFDM subframe; and sending an initial access transmission over said initial access channel from said mobile terminal to said base station, said sending comprising transmitting said initial access transmission within said time slot as a spread signal, said spread signal being spread across the sub-carrier frequencies of said N blocks, wherein a duration of said initial access transmission is less than the duration of said OFDM subframe, wherein the number of OFDM symbol periods comprising said time slot is configured based on a size of a cell that is served by the base station and an estimated or determined maximum ranging delay between said mobile terminal and said base station.

* * * * *